(12) United States Patent
Hirano et al.

(10) Patent No.: US 11,084,121 B2
(45) Date of Patent: Aug. 10, 2021

(54) DOUBLE-ACTING FRICTION STIR SPOT WELDING METHOD AND APPARATUS

(71) Applicant: KAWASAKI JUKOGYO KABUSHIKI KAISHA, Kobe (JP)

(72) Inventors: Masaaki Hirano, Kakamigahara (JP); Etsuko Yamada, Ichinomiya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/810,866

(22) Filed: Mar. 6, 2020

(65) Prior Publication Data

US 2020/0206839 A1 Jul. 2, 2020

Related U.S. Application Data

(63) Continuation of application No. PCT/JP2018/032886, filed on Sep. 5, 2018.

(30) Foreign Application Priority Data

Sep. 8, 2017 (JP) .............................. JP2017-172969

(51) Int. Cl.
  *B23K 20/12* (2006.01)
(52) U.S. Cl.
  CPC ........ *B23K 20/126* (2013.01); *B23K 20/1225* (2013.01)
(58) Field of Classification Search
  CPC ............................................. B23K 20/122–128
  USPC ............................... 228/112.1–114.5, 2.1–2.3
  See application file for complete search history.

(56) References Cited

U.S. PATENT DOCUMENTS

| | | | | |
|---|---|---|---|---|
| 2007/0152015 A1* | 7/2007 | Burton | ................. | B23K 20/126 228/2.1 |
| 2008/0029581 A1* | 2/2008 | Kumagai | ........... | B23K 20/1255 228/101 |
| 2009/0308913 A1* | 12/2009 | Hall | ..................... | B23K 20/126 228/112.1 |
| 2010/0038832 A1* | 2/2010 | Rosal | ................. | B23K 20/1255 266/46 |
| 2010/0084456 A1* | 4/2010 | Carter | .................. | B23K 20/126 228/112.1 |

(Continued)

FOREIGN PATENT DOCUMENTS

| | | | | |
|---|---|---|---|---|
| CA | 2829737 A1 * | 9/2012 | ........... | B23K 20/126 |
| CA | 2829738 A1 * | 9/2012 | ........... | B23K 20/123 |

(Continued)

*Primary Examiner* — Kiley S Stoner
(74) *Attorney, Agent, or Firm* — Xsensus LLP (57) ABSTRACT

A friction stir spot welding method includes a welding step of forming a build-up portion on a workpiece by friction-stirring the workpiece, using a pin and a shoulder, while pressing a surface of the workpiece with an end face of a clamp, and filling a portion of the workpiece being softened in a chamber portion of the clamp by press-fitting at least one of the pin and the shoulder into a plastic flow portion of the workpiece. and the friction stir spot welding method further includes a pressing step of pressing a surface of at least one of a region of the build-up portion, which is frictionally stirred by the shoulder, and an adjacent region of the build-up portion against the end face of the clamp with the pin and the shoulder retracted into an accommodation space.

20 Claims, 5 Drawing Sheets

(56) References Cited

U.S. PATENT DOCUMENTS

| | | | | |
|---|---|---|---|---|
| 2012/0279043 A1* | 11/2012 | Carter | .................. | B21D 39/031 |
| | | | | 29/525.05 |
| 2012/0279271 A1* | 11/2012 | Carter | .................... | H05B 6/101 |
| | | | | 72/342.8 |
| 2014/0069986 A1 | 3/2014 | Okada et al. | | |
| 2020/0101519 A1* | 4/2020 | Sun | ........................ | B21J 15/025 |
| 2020/0276666 A1* | 9/2020 | Haruna | .............. | B23K 20/1255 |
| 2021/0053146 A1* | 2/2021 | Yapici | ........................ | B21J 1/00 |
| 2021/0086291 A1* | 3/2021 | Okada | ................ | B23K 20/1255 |

FOREIGN PATENT DOCUMENTS

| | | | | | |
|---|---|---|---|---|---|
| CA | 2877841 | A1 | * | 2/2014 | ......... B23K 20/1245 |
| JP | 2006297434 | A | * | 11/2006 | ........... B23K 20/125 |
| JP | 2007313520 | A | * | 12/2007 | |
| JP | 2008036659 | A | * | 2/2008 | |
| JP | 2010269367 | A | * | 12/2010 | |
| JP | 4872080 | B2 | * | 2/2012 | |
| JP | 4986532 | B2 | * | 7/2012 | |
| JP | 2012-196682 | A | | 10/2012 | |
| JP | 5431790 | B2 | * | 3/2014 | |
| JP | 2017164788 | A | * | 9/2017 | ............. B23K 20/22 |
| JP | 6307005 | B2 | * | 4/2018 | |
| WO | WO-0128732 | A1 | * | 4/2001 | ........... B23K 20/125 |
| WO | WO-2009126981 | A1 | * | 10/2009 | ........... B23K 20/125 |
| WO | WO-2016063538 | A1 | * | 4/2016 | ........... B23K 20/1255 |
| WO | WO-2017047574 | A1 | * | 3/2017 | ........... B23K 20/122 |
| WO | WO-2019049813 | A1 | * | 3/2019 | ............. B23K 20/12 |
| WO | WO-2019049892 | A1 | * | 3/2019 | ............. B23K 31/003 |
| WO | WO-2019049894 | A1 | * | 3/2019 | ......... B23K 20/1265 |
| WO | WO-2019050002 | A1 | * | 3/2019 | ......... B23K 20/1225 |

* cited by examiner

DOUBLE-ACTING FRICTION STIR SPOT WELDING METHOD AND APPARATUS

CROSS-REFERENCES TO RELATED APPLICATIONS

The present application is a bypass continuation of PCT Application No. PCT/JP2018/032886, filed Sep. 5, 2018, which claims priority to JP 2017-172969, filed Sep. 8, 2017, both of which are incorporated herein by reference.

TECHNICAL FIELD

The present application relates to a double-acting friction stir spot welding method, and more particularly, to a technique for improving a fatigue strength of a joint portion formed by welding.

BACKGROUND ART

Conventionally, a double-acting friction stir spot welding device is provided with a pin member and a shoulder member that can rotate around a predetermined axis independently of each other and advance and retract in an axial direction. The double-action friction stir spot welding device is further provided with a clamp member that surrounds an outer periphery of the shoulder member to advance and retract in the axial direction.

In welding a workpiece by friction stir spot welding, it is required to improve the fatigue strength of a joint portion formed by welding. As a countermeasure, for example, it is conceivable to increase a friction stir welding interface. However, doing so either greatly increases a weight of the workpiece or requires the performance of a process to improve a fatigue strength of the welded portion. Such actions lead to a deterioration in a manufacturing efficiency of the welded bodies.

SUMMARY

In an exemplary implementation of the present application, a friction stir spot welding method for performing friction stir spot welding of a workpiece by using a rotary tool configured to partially stir the workpiece and a clamp member configured to press a surface of the workpiece while the workpiece is supported. The rotary tool includes a pin member configured to rotate around a predetermined axis and advance and retract in an axial direction and a shoulder member configured to rotate around the axis while surrounding an outer periphery of the pin member and advance and retract in the axial direction independently of the pin member. The clamp member is a cylindrical member and includes an inner peripheral surface that surrounds an outer periphery of the shoulder member to form an accommodation space for the shoulder member, an annular end face that comes into surface contact with the surface of the workpiece to press the surface, and a chamber portion interposed between the inner peripheral surface and the end face, recessed in a diameter-increasing direction with respect to the inner peripheral surface, and opening toward the workpiece. The friction stir spot welding method includes a welding step of forming a build-up portion on the workpiece by friction-stirring the workpiece by using the pin member and the shoulder member, while pressing the surface of the workpiece with the end face of the clamp member, and filling a portion of the workpiece being softened in the chamber portion by press-fitting at least one of the pin member and the shoulder member into a plastic flow portion of the workpiece and a pressing step of pressing a surface of at least one of a region of the build-up portion which is frictionally stirred by the shoulder member and an adjacent region of the build-up portion which is adjacent to the friction-stirred region with the end face of the clamp member with the pin member and the shoulder member retracted into the accommodation space.

In the welding step, the build-up portion is formed on the workpiece, and friction stir spot welding of the workpiece is performed at the build-up portion. In the pressing step, the compression portion can be formed in the build-up portion by pressing the surface of at least one of the friction-stirred region of the build-up portion and the adjacent region adjacent to the friction-stirred region of the build-up portion with the end face of the clamp member.

A backing portion may be disposed on an opposite side of the workpiece to the rotary tool so as to support the workpiece, the backing portion having a concave portion formed in a surface facing the workpiece. In the welding step, an additional material that is capable of being frictionally stirred and mixed with the workpiece may be welded to the workpiece by friction stir spot welding with the additional material supplied into the concave portion.

According to the method, the thickness dimension of the build-up portion can be further increased by using the additional material supplied to the concave portion of the backing portion.

In the welding step, the build-up portion may be formed in a circular shape in a front view. In the pressing step, a region on the surface of the workpiece extending in a circumferential direction of the build-up portion over the friction-stirred region and the adjacent region may be pressed with the end face of the clamp member. According to the above method, residual stress can be applied to a wide region of the build-up portion extending over the friction-stirred region of the workpiece and the adjacent region.

In the pressing step, the surface of the workpiece may be pressed with the end face of the clamp member while avoiding contact between a region surrounding the build-up portion of the workpiece and the end face of the clamp member.

The chamber portion of the clamp member may have an inner surface formed as an inclined surface that is inclined such that an inner diameter of the clamp member gradually decreases from a radially inner peripheral edge of the end face of the clamp member toward an inside of the clamp member in an axis direction.

DETAILED DESCRIPTION of the DRAWINGS

Each embodiment will be described below with reference to the accompanying drawings.

First Embodiment

Figure 1:
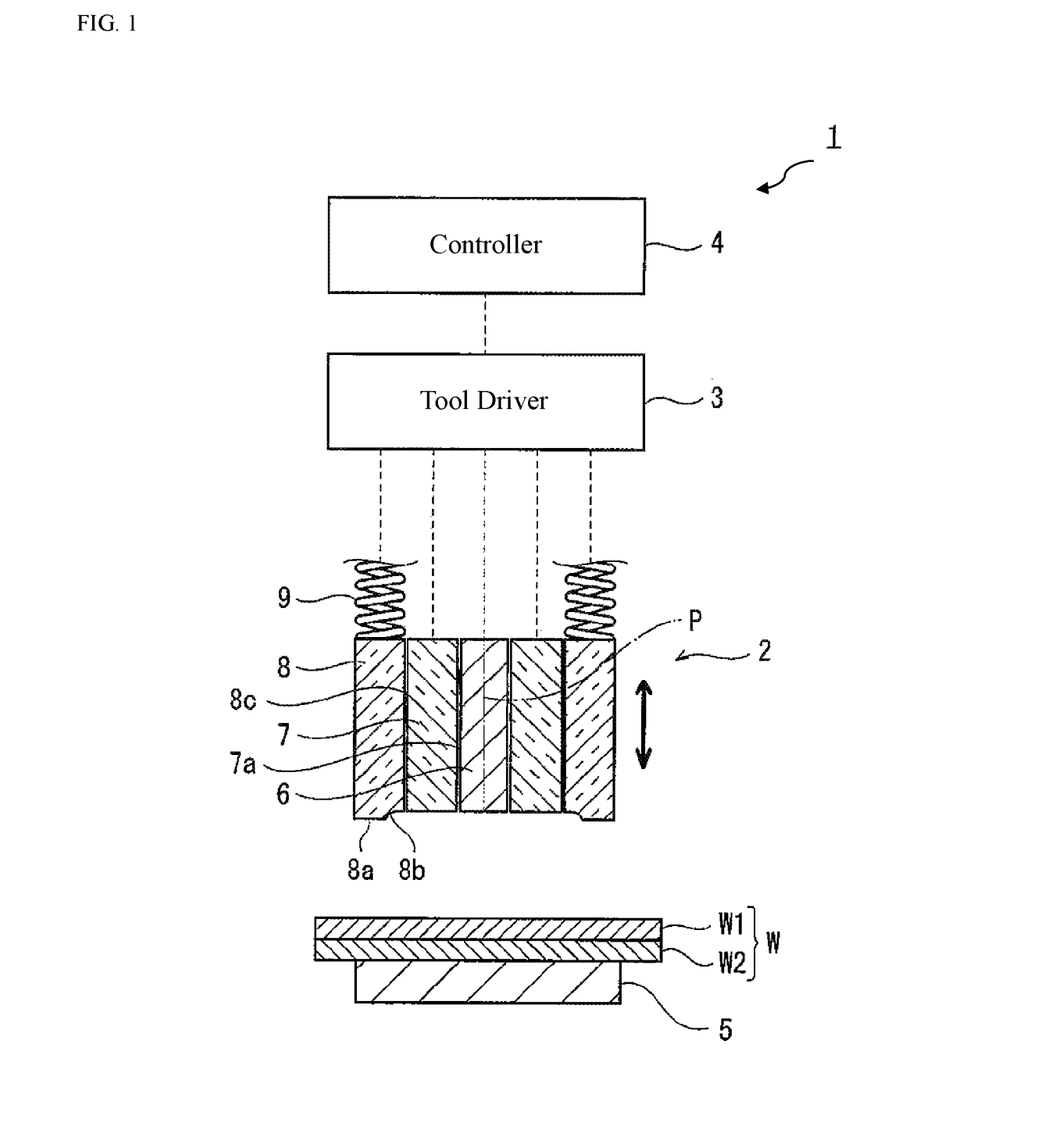
FIG. 1 illustrates a configuration of a main part of a double-acting friction stir spot welding device according to a first embodiment.

FIG. 1 shows a configuration of a main part of a double-acting friction stir spot welding device 1 (referred to as the device 1 hereinafter) according to the first embodiment. Referring to FIG. 1, a rotary tool 2 is shown in cross section, and a connection between the rotary tool 2 and a tool driver 3 is schematically indicated by broken lines.

The device 1 performs friction stir spot welding of workpieces W (for example, a pair of plate materials (a first plate material W1 and a second plate material W2)). The device 1 includes the rotary tool 2, the tool driver 3, a controller 4, a backing portion 5, and a clamp member 8.

The tool driver 3 moves the rotary tool 2 to a plurality of predetermined positions and drives the rotary tool 2 to rotate. The controller 4 controls the tool driver 3 so as to drive members 6 to 8 included in the rotary tool 2. The specific structure of the tool driver 3 is not limited, and for example, a known structure can be used.

The controller 4 is, for example, a computer including a CPU, a ROM, and a RAM, and controls the operation of the tool driver 3. A predetermined control program is stored in the ROM, and setting information input by an operator is stored in the RAM. The setting information includes, for example, information on each plate thickness value of the plate materials W1 and W2 and information on each welding position. The backing portion 5 is a support portion, and is disposed on an opposite side of the workpiece W to the rotary tool 2 to support the workpiece W. A part of the backing portion 5 faces the rotary tool 2 with the workpiece W interposed therebetween.

Moreover, the functionality of the controller 4 disclosed herein may be implemented using circuitry or processing circuitry which includes general purpose processors, special purpose processors, integrated circuits, ASICs ("Application Specific Integrated Circuits"), conventional circuitry, controllers, and/or combinations thereof which are configured or programmed to perform the disclosed functionality. Processors and controllers are considered processing circuitry or circuitry as they include transistors and other circuitry therein. In this disclosure, any circuitry, units, controllers, or means are hardware carry out or are programmed to perform the recited functionality. The hardware may be any hardware disclosed herein or otherwise known which is programmed or configured to carry out the recited functionality. When the hardware is a processor or controller which may be considered a type of circuitry, the circuitry, means, or units are a combination of hardware and software, the software being used to configure the hardware and/or processor.

The rotary tool 2 partially stirs the workpiece W. The rotary tool 2 includes a pin member 6 and a shoulder member 7. The rotary tool 2 has a nested structure in which the shoulder member 7 is disposed outside the pin member 6 and the clamp member 8 is disposed outside the shoulder member 7.

The pin member 6 is provided so as to rotate around a predetermined axis P and to advance and retract in the axis P direction. The pin member 6 of this embodiment is formed in a columnar shape extending in the axis P direction. The rear end portion of the pin member 6 in the axis P direction (the end portion of the pin member 6 which is located on the opposite side to the workpiece W) is supported by a fixing portion of the tool driver 3.

The shoulder member 7 is provided around the outer periphery of the pin member 6 so as to rotate around the axis P and so as to advance and retract in the axis P direction independently of the pin member 6. The shoulder member 7 has a hollow portion 7a, and the pin member 6 is inserted into the hollow portion 7a of the shoulder member 7.

In the rotary tool 2 of this embodiment, the pin member 6 and the shoulder member 7 are provided so as to independently rotate around the axis P and advance and retract in the axis P direction while the pin member 6 is inserted into the hollow portion 7a of the shoulder member 7. The shoulder member 7 is formed in a columnar shape extending in the axis P direction.

The clamp member 8 is provided so as to surround the outer periphery of the shoulder member 7. The clamp member 8 is provided independently of the pin member 6 and the shoulder member 7 so as to be able to advance and retract in the axis P direction.

A spring 9 for applying a biasing force to the clamp member 8 toward the workpiece W in the axis P direction is disposed at the rear end portion of the clamp member 8 in the axis P direction. The clamp member 8 presses the workpiece W supported by the backing portion 5 in the axis P direction by the urging force from the spring 9. When the clamp member 8 is retracted from the workpiece W, the clamp member 8 is pulled up by the tool driver 3 and retracted from the workpiece W.

Figure 2:
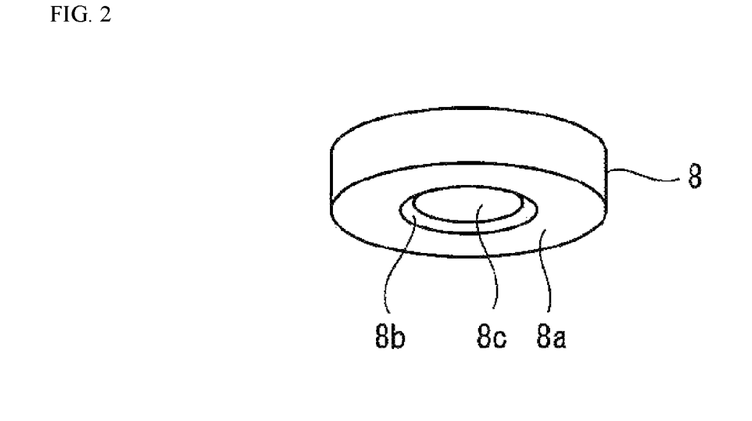
FIG. 2 illustrates a perspective view of a clamp member in FIG. 1 as viewed from the end face side.

FIG. 2 shows a perspective view of the clamp member 8 in FIG. 1 as viewed from an end face 8a side. The clamp member 8 has a shape for applying compressive plastic strain to the welding interface, which is the load transmitting portion of the workpiece W, within the load output range required for a welding step in a normal friction stir spot welding device. Thus, the device 1 includes a compression processing mechanism for the workpiece W.

Specifically, as shown in FIGS. 1 and 2, the clamp member 8 is a cylindrical member and includes an inner peripheral surface 8c, an end face 8a, and a chamber portion 8b. The inner peripheral surface 8c surrounds the outer periphery of the shoulder member 7 to form an accommodation space for the shoulder member 7 (referred to as an accommodation space hereinafter). The end face (abutment surface) 8a has an annular shape, and comes into surface contact with the surface of the workpiece W (a first plate material W1 in this case) to press the surface. The end face 8a extends parallel to a plane perpendicular to the axis P direction.

The chamber portion 8b is interposed between the inner peripheral surface 8c and the end face 8a. The chamber portion 8b is recessed in the diameter-increasing direction with respect to the inner peripheral surface 8c, and the chamber portion 8b opens to the workpiece W side. The chamber portion 8b is provided at the end portion of the clamp member 8 which is located on the workpiece W side (the distal end portion in the axis P direction) and opens to the workpiece W side. That is, the chamber portion 8b opens at the distal end side of the clamp member 8 in the axis P direction and is recessed inward of the clamp member 8 in the axis P direction. The chamber portion 8b is used for forming a build-up portion W4 (see FIG. 4D) on the workpiece W.

The inner surface of the chamber portion 8b of this embodiment is formed as an inclined surface that is inclined such that the inner diameter of the clamp member 8 gradually decreases from the radially inner peripheral edge of the end face 8a toward the inside of the clamp member 8 in the axis P direction. An opening of the accommodation space is formed in the radial center of the end face 8a of this inner surface.

The inclined surface (inner surface) of the chamber portion 8b of this embodiment extends in a curved shape when viewed in a direction perpendicular to the axis P direction of the clamp member 8. For example, the inclined surface extends in an arc shape from the radially inner peripheral edge of the end face 8a when viewed in a direction perpendicular to the axis P direction, and then extends perpendicularly to the axis P direction toward the axis P. The inclined surface may extend linearly from the radially inner peripheral edge of the end face 8a toward the axis P direction when viewed in a direction perpendicular to the axis P direction.

In this embodiment, the shape of the pair of inclined surfaces located on both sides of the axis P when viewed in a direction perpendicular to the axis P direction is symmetrical throughout the entire circumference of the clamp member 8 around the axis P. However, this is not exhaustive.

The shape of the pair of inclined surfaces may be asymmetric when viewed in one direction perpendicular to the axis P direction. In the asymmetric case, for example, the shape of one of the pair of inclined surfaces may be a shape that extends longer in a direction perpendicular to the axis P than the other inclined surface. Further, in the asymmetric case, of the pair of inclined surfaces, the shape of the inclined surface on the side where a compression portion Q (see FIG. 4F) to be described later is expected to be formed may extend longer in a direction perpendicular to the axis P compared to the other inclined surface. This makes it possible to form the compression portion Q in the relatively wide region of the build-up portion W4.

The accommodation space is provided more inwardly in the axis P direction than the chamber portion 8b of the clamp member 8. When the workpiece W is not subjected to friction stir spot welding, the shoulder member 7 is accommodated in the accommodation space with the outer periphery of the shoulder member 7 surrounded. The inner peripheral surface 8c that forms the accommodation space extends in the axis P direction inside the clamp member 8. The pin member 6 is also accommodated in the accommodation space independently of the shoulder member 7. When the pin member 6 and the shoulder member 7 are accommodated in the accommodation space, the opening of the accommodation space is closed by the pin member 6 and the shoulder member 7. When the workpiece W is subjected to friction stir spot welding, the pin member 6 and the shoulder member 7 extend from the accommodation space to the workpiece W side through the chamber portion 8b.

In this case, the inner diameter of the opening of the chamber portion 8b is larger than the inner diameter of the opening of the accommodation space (the outer diameter of the shoulder member 7). Therefore, when the workpiece W is welded by friction stir spot welding using the clamp member 8, the build-up portion W4 formed by the chamber portion 8b is provided with a welding interface between a friction-stirred region J generated by friction stir using the pin member 6 and the shoulder member 7 and an adjacent region adjacent to the region J.

The device 1 may have, for example, a C-shaped frame structure. In this case, the rotary tool 2, the tool driver 3, the controller 4, and the clamp member 8 may be disposed at the upper part of the device 1, and the backing portion 5 may be disposed at the lower part of the device 1. The device 1 may be attached to, for example, an articulated robot. In addition, in the device 1, the rotary tool 2, the tool driver 3, the controller 4, and the clamp member 8 may be attached to the articulated robot, and the backing portion 5 may be attached to another component (positioner or the like) different from the articulated robot.

Figure 3:
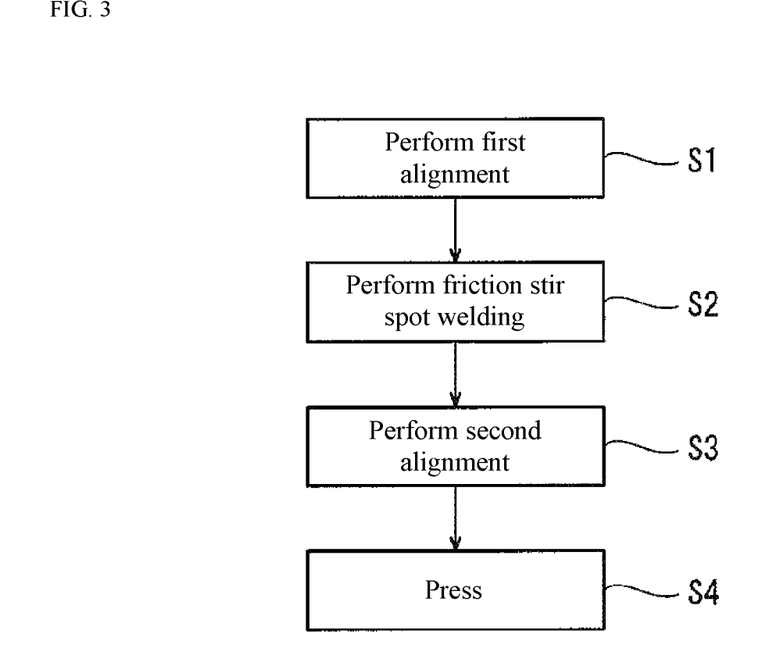
FIG. 3 illustrates a flowchart of a friction stir spot welding method according to the first embodiment.

FIG. 3 illustrates a flowchart of a friction stir spot welding method according to the first embodiment. As shown in FIG. 3, in this method, a sequence including a plurality of steps S1 to S4 in the order mentioned is performed.

Specifically, in first alignment step S1, the rotary tool 2 is aligned with respect to the workpiece W in order to perform friction stir spot welding at a predetermined welding position. In welding step S2 after first alignment step S1, the pin member 6 and the shoulder member 7 are pushed into (press-fitted into) the workpiece W while being rotated at the welding position, and the workpiece W is welded by friction stir spot welding. In welding step S2, the build-up portion W4 is formed on the workpiece W by filling the chamber portion 8b with part of the workpiece W.

In second alignment step S3 after welding step S2, the pin member 6 and the shoulder member 7 are retracted from the workpiece W and the clamp member 8 is aligned with respect to the workpiece W to press the workpiece W at a predetermined pressing position on the surface of the build-up portion W4. In pressing step S4, after second alignment step S3, the end face 8a of the clamp member 8 is caused to press the build-up portion W4 at the pressing position. Performing this pressing step S4 will apply residual stress to the build-up portion W4 of the workpiece W by compressing the build-up portion W4 and improve the fatigue strength of the workpiece W. Thus, performance of the method illustrated in the flowchart of FIG. 3 efficiently improves a fatigue strength of a joint portion of a workpiece while suppressing an increase in the weight of the workpiece when double-acting friction stir spot welding. This makes it possible to widely and suitably apply the present application to each field using double-acting friction stir spot welding.

With respect to the friction stir spot welding method of FIG. 3, the operator may first input the setting information to the device 1 and make the backing portion 5 hold the plate materials W1 and W2 in an overlaid state.

The controller 4 controls the tool driver 3 so as to match the outer peripheral edge of the end face of the shoulder member 7, which is located on the workpiece W side with the inner peripheral edge of the inclined surface of the chamber portion 8b, and to match the outer peripheral edge of the end face of the pin member 6, which is located on the workpiece W side with the inner peripheral edge of the end face of the shoulder member 7 which is located on the workpiece W side.

Figure 4A:
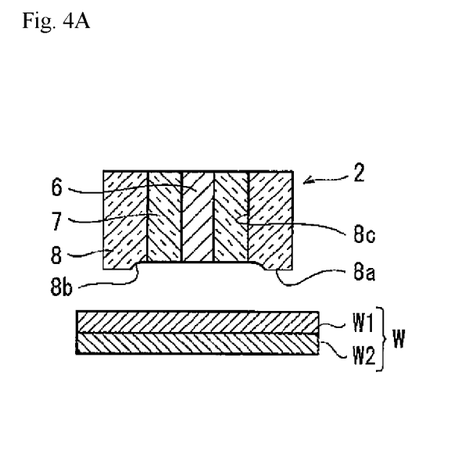
FIGS. 4A-4F illustrate cross-sectional views for explaining the friction stir spot welding method according to the first embodiment.

FIGS. 4A-4F illustrate cross-sectional views for explaining the friction stir spot welding method of FIG. 3 according to the first embodiment. In particular, the controller 4 controls the tool driver 3 so as to move the rotary tool 2 to a predetermined welding position, as illustrated in FIG. 4A. Thus, first alignment step S1 is performed to align the rotary tool 2 with the workpiece W.

Next, the controller 4 controls the tool driver 3 so as to rotate/drive the pin member 6 and the shoulder member 7, and also controls the tool driver 3 so as to cause the shoulder member 7 and the clamp member 8 to come into contact with the surface of the workpiece W. Thereafter, the controller 4 controls the tool driver 3 so as to press the shoulder member 7 against the workpiece 7.

Figure 4B:
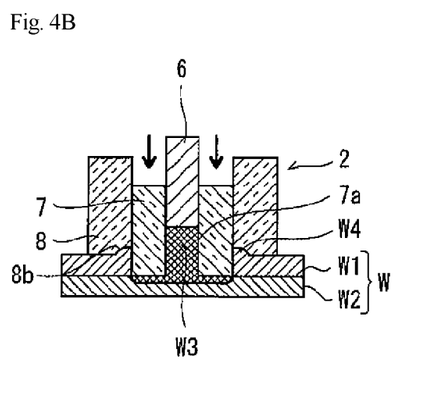
Figure 4C:
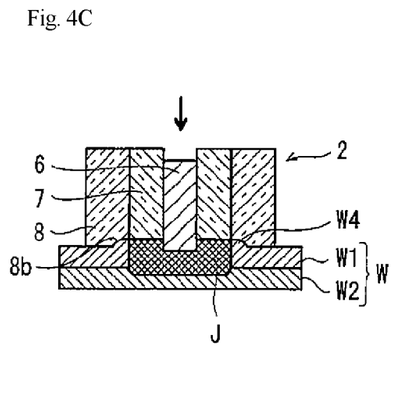

With this operation, in a state in which the surface of the workpiece W is pressed with the end face 8a, the workpiece W is frictionally stirred by the pin member 6 and the shoulder member 7, and at least one of the pin member 6 and the shoulder member 7 (both in this case, including the state shown in FIG. 4C) is press-fitted into the plastic flow portion W3 of the workpiece W, so that a portion of the workpiece W being softened is filled in the chamber portion 8b to form the build-up portion W4 on the workpiece W, as illustrated in FIGS. 4B and 4C.

The build-up portion W4 includes a plastic flow portion W3 of the workpiece W which is generated by friction stir by the pin member 6 and the shoulder member 7 and a softened portion of the workpiece W which is softened accompanying the generation of the plastic flow portion W3.

At this time, the controller 4 controls the tool driver 3 to move the end face of the pin member 6 which is located on the workpiece W side to the opposite side to the pushing direction relative to the end face of the shoulder member 7 which is located on the workpiece W side. As a result, a plastic flow portion W3 of the workpiece W enters the hollow portion 7a of the shoulder member 7, as illustrated in FIG. 4B.

Next, in a state in which the end face 8a of the clamp member 8 is in surface contact with the surface of the workpiece W, the controller 4 controls the tool driver 3 to move the end faces of the pin member 6 and the shoulder member 7 which are located on the workpiece W side toward the surface position of the workpiece W before the pin member 6 and the shoulder member 7 come into contact with the surface of the workpiece W.

As a result, the shoulder member 7 is retracted into the accommodation space while the plastic flow portion W3 of the workpiece W that has entered the inside of the shoulder member 7 is backfilled by the pin member 6. In the first embodiment, the controller 4 controls the tool driver 3 so as to position the end face of the pin member 6 which is located on the workpiece W side more inwardly in the workpiece W than the surface (top surface) of the build-up portion W4 in consideration of the volume of the build-up portion W4, as illustrated in FIG. 4C.

Welding step S2 is performed as described above, and the workpiece W is subjected to friction stir spot welding, so that the region J having undergone friction stir is formed in the build-up portion W4. A concave portion R is formed by the pin member 6 in the center of the friction-stirred region J, as illustrated in FIG. 4D.

Figure 4D:
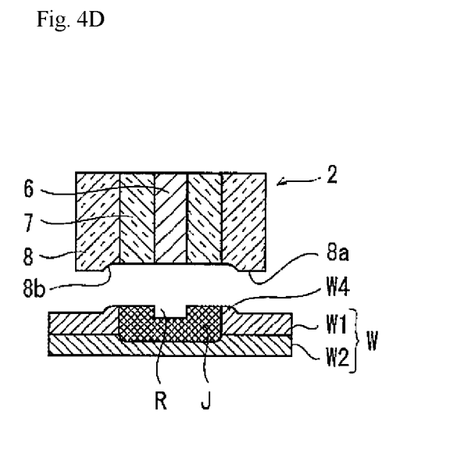
Figure 4E:
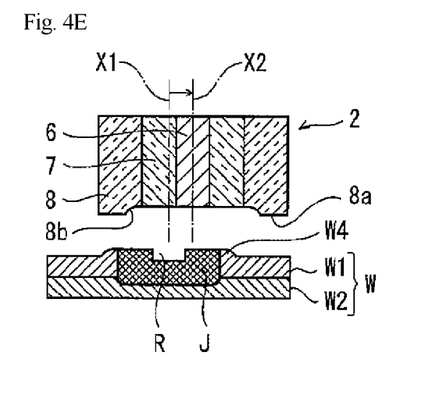

Next, the controller 4 controls the tool driver 3 so as to separate (retract) the pin member 6, the shoulder member 7, and the clamp member 8 from the workpiece W, as illustrated in FIG. 4D. Thereafter, the controller 4 controls the tool driver 3 so as to align the rotary tool 2 by moving the axis P position of the pin member 6 with respect to the workpiece W along the surface of the workpiece W from a position X1 at the time of friction stir spot welding to a position X2 shifted by a predetermined distance, as illustrated in FIG. 4E. Second alignment step S3 is performed in the above manner to perform alignment so as to make the end face 8a face the top surface of the build-up portion W4.

In this embodiment, the position X2 is set to a position at which the end face 8a overlaps the friction-stirred region J when viewed in the axis P direction. Further, when the end face 8a comes into contact with the top surface of the build-up portion W4 at the position X2, the end face 8a comes into surface contact with each peripheral edge of the friction-stirred region J and the adjacent region adjacent to the region J, and also comes into surface contact with a region extending in the circumferential direction of the friction-stirred region J.

In other words, at the top of the build-up portion W4, the end face 8a can press the surface of the workpiece W so as to form a compression portion Q described later over the friction-stirred region J and the adjacent region adjacent to the region J.

The operation of retracting the pin member 6, the shoulder member 7, and the clamp member 8 from the workpiece W and the alignment operation of the rotary tool 2 in second alignment step S3 may be performed simultaneously.

Figure 4F:
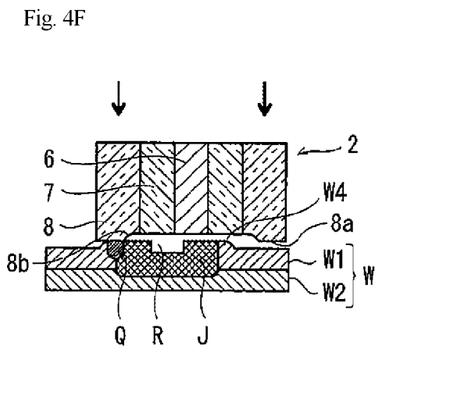

Next, in a state in which the pin member 6 and the shoulder member 7 are retracted in the accommodation space of the clamp member 8, the surface of at least one (both in this case) of the region J of the build-up portion W4 which is frictionally stirred by the shoulder member 7 and the region of the build-up portion W4 which is adjacent to the friction-stirred region J is pressed with the end face 8a.

In this embodiment, after second alignment step S3, the controller 4 controls the tool driver 3 so as to cause the end face 8a of the clamp member 8 to press the surface of the friction-stirred region J of the build-up portion W4 and the surface of the adjacent region adjacent to the region J while the axis P position of the pin member 6 with respect to the workpiece W is aligned with the position X2, as illustrated in FIG. 4F.

As described above, pressing step S4 is performed to form a compression portion (compression plastic strain portion) Q on the build-up portion W4 of the workpiece W and apply residual stress to the workpiece W. In pressing step S4, the surface of the workpiece W is pressed with the end face 8a while avoiding contact between the region surrounding the build-up portion W4 of the workpiece W and the end face 8a.

By performing pressing step S4 in a state in which the temperature of the friction-stirred region J is lower than the friction stir temperature, the workpiece W is cold-compressed. Thereafter, the controller 4 controls the tool driver 3 so as to release the pressing by the clamp member 8.

Figure 5:
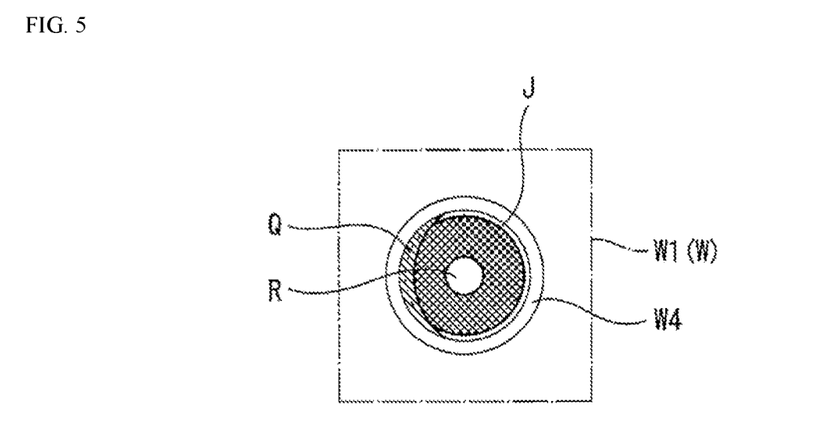
FIG. 5 illustrates a front view of the joint portion of a workpiece formed by the friction stir spot welding method according to the first embodiment.
Figure 6:
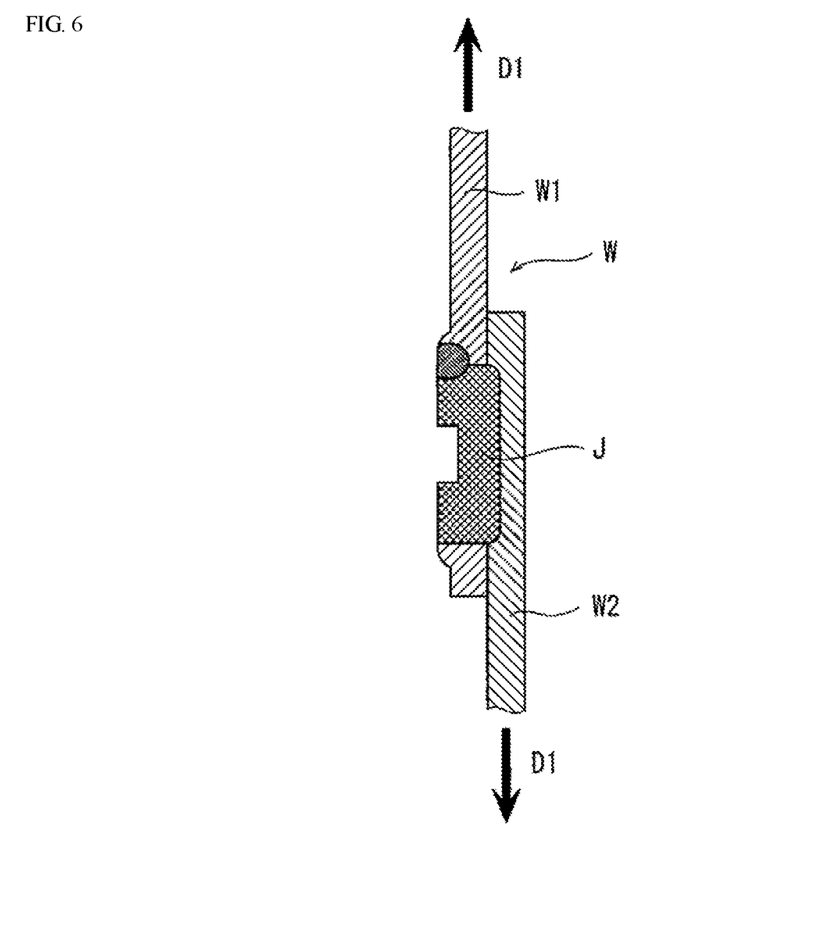
FIG. 6 illustrates a cross-sectional view showing a state when a tensile load is applied from both ends of the workpiece to the joint portion of the workpiece formed by the friction stir spot welding method according to the first embodiment.

FIG. 5 shows a front view of the joint portion of the workpiece W formed by the friction stir spot welding method according to the first embodiment. FIG. 6 shows a cross-sectional view showing a state when a tensile load is applied from both ends of the workpiece W to the joint portion of the workpiece W formed by the friction stir spot welding method according to the first embodiment.

As shown in FIG. 5, the workpiece W after friction stir spot welding has the build-up portion W4 formed in a circular shape when viewed in a front view (viewed in the axis P direction). For example, the build-up portion W4 is formed in a truncated cone shape whose diameter gradually decreases from the bottom to the top. The friction-stirred region J is formed in a circular shape at the top of the build-up portion W4.

A concave portion R is formed by the pin member 6 in the center of the friction-stirred region J. The radial centers of the friction-stirred region J and the concave portion R coincide with each other. The compression portion Q is formed in an arc shape along the peripheral edges of the friction-stirred region J and the adjacent region adjacent to the region J at the top of the build-up portion W4. The compression portion Q and the concave portion R are spaced apart from each other. The workpiece W is provided with residual stress (compressive residual stress) due to the formation of the compression portion Q. This improves the fatigue strength.

For this reason, for example, as shown in FIG. 6, when a fatigue load repeatedly applies a tensile force D1 to the first plate material W1 and the second plate material W2 of the workpiece W in the direction in which each of the plate materials W1 and W2 extends and the boundary (welding boundary) of the friction stir region J becomes a starting point and a propagation path of fatigue fracture, the fatigue life of the workpiece W is extended by virtue of the residual stress applied to the compression portion K.

Because the friction-stirred region J is formed in the build-up portion W4, the welding interface between the friction-stirred region J and the adjacent region adjacent to the region J increases, and the joint strength improves. Further, partially forming the build-up portion W4 on the workpiece W suppresses an increase in the weight of the workpiece W while improving the joint strength.

Because the thickness dimension around the welded joint of the workpiece W is partially increased by providing the welded joint for the build-up portion W4, the rigidity of the workpiece W can be improved, and proper strength can be achieved with respect to loads such as a breaking load and a bending load.

Note that the length of the compression portion Q may be shorter than the entire perimeter of the friction-stirred region J. Furthermore, the length of the compression portion K may be set as appropriate according to the strength required for the joint portion of the workpiece W, the load level to be applied, and the combined load.

According to the study by the present inventors, the length of the compression portion K may be, for example, a value in a range of ½ or less of the entire perimeter of the friction stir region J when a uniaxial tensile load shown in FIG. 6 is applied. Further, the compression portions Q may be formed at a plurality of positions in one friction-stirred region J at the top of the build-up portion W4. The plurality of compression portions Q may be arranged in the radial direction of the friction-stirred region J, or may be arranged in the circumferential direction of the friction-stirred region J in a front view of the build-up portion W4.

As described above, according to the friction stir spot welding method of the present embodiment, in welding step S2, the build-up portion W4 is formed on the workpiece W, and friction stir spot welding of the workpiece W is performed at the build-up portion W4. In pressing step S4, the compression portion Q can be formed in the build-up portion W4 by pressing the surface of at least one of the friction-stirred region J of the build-up portion W4 and the adjacent region adjacent to the friction-stirred region J with the end face 8a of the clamp member 8.

This makes it possible to improve the fatigue strength of the joint portion of the workpiece W by locally applying residual stress to the joint portion of the workpiece W and to increase the welding interface located between the friction-stirred region J and the adjacent region adjacent to the region J and improve the rigidity of the joint portion of the workpiece W while suppressing an increase in the weight of the workpiece W.

Further, because the build-up portion W4 of the workpiece W is pressed with the end face 8a of the clamp member 8, the workpiece W can be pressed properly at an appropriate position with a relatively small pressing force because the pressing area can be reduced. For this reason, it is not necessary to separately prepare a dedicated device for pressing the workpiece W, and the workpiece W can be quickly pressed during a series of friction stir spot welding operations. Therefore, the cost and workload for improving the fatigue strength of the joint portion can be reduced. In addition, the fatigue strength of the joint portion can be improved efficiently.

In welding step S2, the build-up portion W4 is formed in a circular shape in a front view. In pressing step S4, a region on the surface extending in the circumferential direction of the build-up portion W4 over the friction-stirred region J and the adjacent region adjacent to the region J is pressed with the end face 8a. This makes it possible to apply residual stress to a wide region of the build-up portion W4 extending over the friction-stirred region J of the workpiece W and the adjacent region adjacent to the region J.

In pressing step S4, because the surface of the workpiece W is pressed with the end face 8a while avoiding contact between the region surrounding the build-up portion W4 of the workpiece W and the end face 8a, a pressing force can be intensively applied to the build-up portion W4. This reduces the pressed area and hence can properly press the workpiece W with a relatively small pressing force.

A clamp member used as the clamp member 8 has the chamber portion 8b whose inner surface is an inclined surface that is inclined such that the inner diameter of the clamp member 8 gradually decreases from the radially inner peripheral edge of the end face 8a toward the inside of the clamp member 8 in the axis P direction. Accordingly, using the inclined surface formed on the chamber portion 8b as a draft makes it possible to easily remove the build-up portion W4 from the chamber portion 8b after welding step S2, thereby efficiently performing welding the step S2 and pressing step S4. The second embodiment will be described, focusing on differences from the first embodiment.

Second Embodiment

Figure 7:
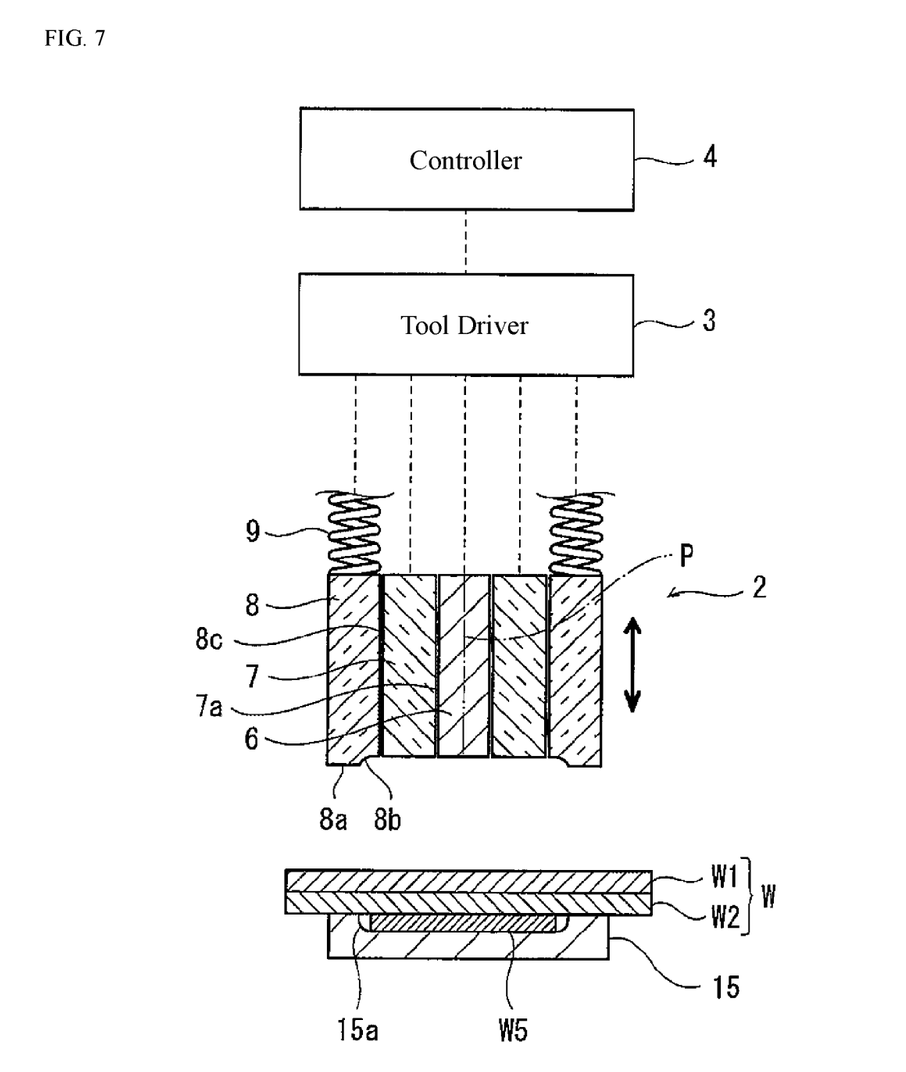
FIG. 7 illustrates a view showing a configuration of a main part of a double-acting friction stir spot welding device according to a second embodiment.

FIG. 7 illustrates a view showing the configuration of the main part of a double-acting friction stir spot welding device according to the second embodiment. This embodiment differs from the first embodiment in that a backing portion 15 has a concave portion 15a formed in the surface facing the workpiece W so as to be recessed in the axis P direction. The concave portion 15a is provided at a position facing a chamber portion 8b with a workpiece W interposed between them, and extends along the surface of the workpiece W.

For example, the concave portion 15a has a peripheral edge having a circuit shape when viewed in a front view (viewed in the axis P direction). The concave portion 15a has an inclined surface whose inner diameter gradually decreases from the peripheral edge toward the inside of the backing portion 15 in the axis P direction and a bottom surface surrounded by the inclined surface. The inner diameter of the peripheral edge of the concave portion 15a can be set as appropriate, and is set larger than the outer diameter of the shoulder member 7 in this case.

In the friction stir spot welding method according to the second embodiment, the backing portion 15 is used which is disposed so as to support the workpiece W on the opposite side of the workpiece W to a rotary tool 2 and has the concave portion 15a formed in the backing portion 15. In welding step S2, an additional material W5 capable of being frictionally stirred and mixed with the workpiece W is welded to the workpiece W by friction stir spot welding with the additional material W5 supplied into the concave portion 15a. In this case, for example, the friction stir spot welding of plate materials W1 and W2 of the workpiece W is performed simultaneously with that of the additional material W5.

As a result, the additional material W5 is integrated with the workpiece W while being molded using the concave portion 15a as a mold. Therefore, the thickness dimension of the build-up portion W4 formed in the second embodiment is increased more than the thickness dimension of the build-up portion W4 formed in the first embodiment.

As described above, according to the friction stir spot welding method of the second embodiment, the thickness dimension of the build-up portion W4 can be further increased by using the additional material W5 supplied to the concave portion 15a of the backing portion 15. Therefore, it is possible to further increase the welding interface located between the friction-stirred region J and the adjacent region adjacent to the region J while suppressing an increase in the weight of the workpiece W.

The material characteristics of the additional material W5 can be added to the workpiece W by setting different materials for the workpiece W and the additional material W5 before the friction stir mixing. Accordingly, the fatigue strength of the build-up portion W4 can be improved, and the degree of freedom in designing the characteristics of the workpiece W after the friction stir spot welding can be increased.

The shape of the additional material W5 can be set as appropriate. The additional material W5 is not limited to a plate shape, and may be, for example, a block shape or a powder shape. Further, in welding step S2 of the second embodiment, it is not necessary to perform the friction stir spot welding of the plate materials W1 and W2 of the workpiece W simultaneously with that of the additional material W5. For example, the additional material W5 may be welded to the workpiece W by friction stir spot welding after the friction stir spot welding of the plate materials W1 and W2 of the workpiece W.

The present application can be widely and suitably used in not only the field double-acting friction stir spot welding, but also in welding and mechanical pressing technologies in general.

The present application is not limited to the above-described embodiments, and the configuration or method thereof can be changed, added, or deleted without departing from the spirit of the present invention. Obviously, the workpiece W is not limited to the pair of plate materials W1, W2. The workpiece W may be a component of a vehicle such as an aircraft, an automobile, or a railway vehicle, or may be a component of a building.

Each of the above-described embodiments has exemplified the arrangement configured to drive the pin member 6, the shoulder member 7, and the clamp member 8 by using the single tool driver 3. However, one or two of these members may be driven by another driver, or each member may be driven by an individual driver.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST

J friction-stirred region
P axis
W workpiece
W3 plastic flow portion
W4 build-up portion
W5 additional material
2 rotary tool
5, 15 backing portion
6 pin member
7 shoulder member
8 clamp member
8a end face
8b chamber portion
8c inner peripheral surface
15a concave portion

The invention claimed is:

1. A friction stir spot welding method for performing friction stir spot welding of a workpiece by using a rotary tool that partially stirs the workpiece and a clamp that presses a surface of the workpiece while the workpiece is supported,
the rotary tool including
a pin that rotates around a predetermined axis and advance and retract in an axial direction, and
a shoulder that rotates around the axis while surrounding an outer periphery of the pin and advance and retract in the axial direction independently of the pin,
the clamp being cylindrical and including
an inner peripheral surface that surrounds an outer periphery of the shoulder to form an accommodation space for the shoulder,
an annular end face that comes into surface contact with the surface of the workpiece to press the surface, and
a chamber portion interposed between the inner peripheral surface and the end face, recessed in a diameter-increasing direction with respect to the inner peripheral surface, and opening toward the workpiece,
the friction stir spot welding method comprising:
a welding step of
forming a build-up portion on the workpiece by friction-stirring the workpiece, using the pin and the shoulder, while pressing the surface of the workpiece with the end face of the clamp; and
filling a portion of the workpiece being softened in the chamber portion by press-fitting at least one of the pin and the shoulder into a plastic flow portion of the workpiece; and
a pressing step of pressing a surface of at least one of a region of the build-up portion and an adjacent region of the build-up portion, which is adjacent to the friction-stirred region, against the end face of the clamp with the pin and the shoulder retracted into the accommodation space.

2. The friction stir spot welding method according to claim 1, wherein
a backing portion is disposed on an opposite side of the workpiece to the rotary tool so as to support the workpiece, the backing portion having a concave portion formed in a surface facing the workpiece, and
the welding step further includes welding an additional material, capable of being frictionally stirred and mixed with the workpiece, to the workpiece by friction stir spot welding with the additional material supplied into the concave portion.

3. The friction stir spot welding method according to claim 1, wherein
in the welding step, the build-up portion is formed in a circular shape in a front view, and the pressing step further includes pressing a region on the surface of the workpiece, that extends in a circumferential direction of the build-up portion over the friction-stirred region and the adjacent region, with the end face of the clamp member.

4. The friction stir spot welding method according to claim 1, wherein the surface of the workpiece is pressed with the end face of the clamp member while avoiding contact between a region surrounding the build-up portion of the workpiece and the end face of the clamp member.

5. The friction stir spot welding method according to claim 1, wherein the chamber portion of the clamp member has an inner surface formed as an inclined surface that is inclined such that an inner diameter of the clamp member gradually decreases from a radially inner peripheral edge of the end face of the clamp member toward an inside of the clamp member in an axis direction.

6. The friction stir spot welding method according to claim 2, wherein
in the welding step, the build-up portion is formed in a circular shape in a front view, and
the pressing step further includes pressing a region on the surface of the workpiece, that extends in a circumferential direction of the build-up portion over the friction-stirred region and the adjacent region, with the end face of the clamp member.

7. The friction stir spot welding method according to claim 2, wherein the surface of the workpiece is pressed with the end face of the clamp member while avoiding contact between a region surrounding the build-up portion of the workpiece and the end face of the clamp member.

8. The friction stir spot welding method according to claim 2, wherein the chamber portion of the clamp member has an inner surface formed as an inclined surface that is inclined such that an inner diameter of the clamp member gradually decreases from a radially inner peripheral edge of the end face of the clamp member toward an inside of the clamp member in an axis direction.

9. The friction stir spot welding method according to claim 1, further comprising a first aligning step performed prior to the welding step, the first aligning step including aligning the rotary tool with respect to the workpiece.

10. The friction stir spot welding method according to claim 9, further comprising a second aligning step performed after the welding step and before the pressing step, the second aligning step including aligning the clamp with respect to the workpiece so that the clamp presses the workpiece at a predetermined pressing position on the build-up portion.

11. A friction stir spot welding apparatus that performs friction stir spot welding of a workpiece, the friction stir spot welding apparatus comprising:
a rotary tool that includes
a pin that rotates around a predetermined axis and advance and retract in an axial direction, and
a shoulder that rotates around the axis while surrounding an outer periphery of the pin and advance and retract in the axial direction independently of the pin;
a clamp including
an inner peripheral surface that surrounds an outer periphery of the shoulder to form an accommodation space for the shoulder,
an annular end face that comes into surface contact with a surface of the workpiece to press the surface, and
a chamber portion interposed between the inner peripheral surface and the end face, recessed in a diameter-increasing direction with respect to the inner peripheral surface, and opening toward the workpiece;
a tool driver; and
processing circuitry configured to control the tool driver to
form a build-up portion on the workpiece by friction-stirring the workpiece, using the pin and the shoulder, while pressing the surface of the workpiece with the end face of the clamp;
fill a portion of the workpiece being softened in the chamber portion by press-fitting at least one of the pin and the shoulder into a plastic flow portion of the workpiece; and
press a surface of at least one of a region of the build-up portion and an adjacent region of the build-up portion, which is adjacent to the friction-stirred region, against the end face of the clamp with the pin and the shoulder retracted into the accommodation space.

12. The friction stir spot welding apparatus according to claim 11, wherein
a backing portion is disposed on an opposite side of the workpiece to the rotary tool so as to support the workpiece, the backing portion having a concave portion formed in a surface facing the workpiece, and
the processing circuitry is further configured to control the tool driver to weld an additional material, capable of being frictionally stirred and mixed with the workpiece, to the workpiece by friction stir spot welding with the additional material supplied into the concave portion.

13. The friction stir spot welding apparatus according to claim 11, wherein
the build-up portion is formed in a circular shape in a front view, and
the processing circuitry is further configured to control the tool driver to press a region on the surface of the workpiece, that extends in a circumferential direction of the build-up portion over the friction-stirred region and the adjacent region, with the end face of the clamp member.

14. The friction stir spot welding apparatus according to claim 11, wherein the surface of the workpiece is pressed with the end face of the clamp member while avoiding contact between a region surrounding the build-up portion of the workpiece and the end face of the clamp member.

15. The friction stir spot welding apparatus according to claim 11, wherein the chamber portion of the clamp member has an inner surface formed as an inclined surface that is inclined such that an inner diameter of the clamp member gradually decreases from a radially inner peripheral edge of the end face of the clamp member toward an inside of the clamp member in an axis direction.

16. The friction stir spot welding apparatus according to claim 12, wherein
the build-up portion is formed in a circular shape in a front view, and
the processing circuitry is further configured to control the tool driver to press a region on the surface of the workpiece, that extends in a circumferential direction of the build-up portion over the friction-stirred region and the adjacent region, with the end face of the clamp member.

17. The friction stir spot welding apparatus according to claim 12, wherein the surface of the workpiece is pressed with the end face of the clamp member while avoiding contact between a region surrounding the build-up portion of the workpiece and the end face of the clamp member.

18. The friction stir spot welding apparatus according to claim 11, wherein the processing circuitry is further configured to control the tool driver to, prior to the forming the build-up portion, align the rotary tool with respect to the workpiece.

19. The friction stir spot welding apparatus according to claim 18, wherein the processing circuitry is further configured to control the tool driver to, after the filling the portion of the workspace and prior to pressing the surface of the at least one of the region, align the clamp with respect to the workpiece so that the clamp presses the workpiece at a predetermined pressing position on the build-up portion.

20. A friction stir spot welding apparatus that performs friction stir spot welding of a workpiece, the friction stir spot welding apparatus comprising:
    a rotary tool that includes
        a pin that rotates around a predetermined axis and advance and retract in an axial direction, and
        a shoulder that rotates around the axis while surrounding an outer periphery of the pin and advance and retract in the axial direction independently of the pin;
    a clamp including
        an inner peripheral surface that surrounds an outer periphery of the shoulder to form an accommodation space for the shoulder,
        an annular end face that comes into surface contact with a surface of the workpiece to press the surface, and
        a chamber portion interposed between the inner peripheral surface and the end face, recessed in a diameter-increasing direction with respect to the inner peripheral surface, and opening toward the workpiece;
    a tool driver; and
    controlling means for controlling the tool driver to
        form a build-up portion on the workpiece by friction-stirring the workpiece, using the pin and the shoulder, while pressing the surface of the workpiece with the end face of the clamp;
        fill a portion of the workpiece being softened in the chamber portion by press-fitting at least one of the pin and the shoulder into a plastic flow portion of the workpiece; and
        press a surface of at least one of a region of the build-up portion and an adjacent region of the build-up portion, which is adjacent to the friction-stirred region, against the end face of the clamp with the pin and the shoulder retracted into the accommodation space.

\* \* \* \* \*